(12) United States Patent
Goodsitt et al.

(10) Patent No.: US 11,522,688 B2
(45) Date of Patent: *Dec. 6, 2022

(54) ENCODED DATA ALONG TAPE BASED ON COLORSPACE SCHEMES

(71) Applicant: Capital One Services, LLC, McLean, VA (US)

(72) Inventors: Jeremy Edward Goodsitt, Champaign, IL (US); Austin Grant Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/060,244

(22) Filed: Oct. 1, 2020

(65) Prior Publication Data

US 2021/0105132 A1 Apr. 8, 2021

Related U.S. Application Data

(63) Continuation of application No. 16/592,705, filed on Oct. 3, 2019, now Pat. No. 10,833,852.

(51) Int. Cl.
*H04L 9/08* (2006.01)
*G11B 5/008* (2006.01)

(52) U.S. Cl.
CPC .......... *H04L 9/085* (2013.01); *G11B 5/00813* (2013.01); *H04L 9/0891* (2013.01)

(58) Field of Classification Search
CPC .... H04L 9/085; H04L 9/0891; G11B 5/00813
See application file for complete search history.

(56) References Cited

U.S. PATENT DOCUMENTS

| 5,638,496 | A | 6/1997 | Sato |
| 5,992,748 | A | 11/1999 | Takahashi et al. |

(Continued)

FOREIGN PATENT DOCUMENTS

| CN | 206097730 U | 4/2017 |
| EP | 3192022 A1 | 7/2017 |

(Continued)

OTHER PUBLICATIONS

Baluja et al., "Task-specific color spaces and compression for machine-based object recognition", Technical Disclosure Commons (Year: 2019), 9 pages.

*Primary Examiner* — Ellen Tran
(74) *Attorney, Agent, or Firm* — KDB

(57) ABSTRACT

Techniques to transmit encoded data along a physical medium, e.g. tape, and decode the transmitted data along the physical medium are provided. Some techniques include logic to encode data transmitted along a physical medium, such as a tape suitable for any purpose including the encoding of multimedia data, where the encoding is pursuant to a conversion between a first and second colorspace. The logic may further be configured to decode the data once it is received at a node along the tape, where the colorspace conversion provides the basis, key, or cipher for preforming the decoding operation. The logic may be further configured to alter the encryption and decryption basis, key, or cypher by altering the colorspace scheme defining the encoding (and by extension the decoding) during transmission, including a transmission that takes place after a previous transmission governed by the previously defined (and subsequently altered) colorspace conversion scheme. Other embodiments are described and claimed.

20 Claims, 10 Drawing Sheets

(56) References Cited

U.S. PATENT DOCUMENTS

| | | | |
|---|---|---|---|
| 6,070,805 A | 6/2000 | Kaufman et al. | |
| 6,590,996 B1* | 7/2003 | Reed | H04N 19/467 |
| | | | 348/460 |
| 6,591,009 B1* | 7/2003 | Usami | H04N 1/32267 |
| | | | 382/164 |
| 6,956,967 B2 | 10/2005 | Gindele et al. | |
| 6,985,252 B1 | 1/2006 | Kubo | |
| 7,170,645 B2 | 1/2007 | Kim et al. | |
| 7,180,629 B1 | 2/2007 | Nishio et al. | |
| 7,314,283 B2 | 1/2008 | Tsukada | |
| 7,327,875 B2 | 2/2008 | Sawada | |
| 7,755,671 B2 | 7/2010 | Wang et al. | |
| 8,483,479 B2 | 7/2013 | Kunkel et al. | |
| 8,665,347 B2 | 3/2014 | Miyawaki et al. | |
| 8,847,972 B2 | 9/2014 | Kane et al. | |
| 8,941,755 B2 | 1/2015 | Nikkanen | |
| 9,111,186 B2 | 8/2015 | Blasinski et al. | |
| 9,449,578 B2* | 9/2016 | Roux | G09G 5/02 |
| 10,360,651 B1* | 7/2019 | Hoarty | H04N 19/467 |
| 10,523,420 B1* | 12/2019 | Walters | H04L 9/16 |
| 10,796,122 B1 | 10/2020 | Walters et al. | |
| 10,833,852 B1* | 11/2020 | Goodsitt | H04L 9/085 |
| 10,867,226 B1 | 12/2020 | Walters et al. | |
| 10,878,600 B1 | 12/2020 | Goodsitt et al. | |
| 10,944,914 B1 | 3/2021 | Le et al. | |
| 10,977,462 B2 | 4/2021 | Walters et al. | |
| 10,977,535 B2 | 4/2021 | Walters et al. | |
| 10,977,536 B2 | 4/2021 | Walters et al. | |
| 2003/0176785 A1 | 9/2003 | Buckman et al. | |
| 2003/0228016 A1 | 12/2003 | Shimada | |
| 2003/0235923 A1 | 12/2003 | Jurik et al. | |
| 2004/0117751 A1 | 6/2004 | Shrowty et al. | |
| 2005/0069168 A1* | 3/2005 | Zarrabizadeh | H04N 1/32144 |
| | | | 382/100 |
| 2005/0128491 A1 | 6/2005 | Kubo | |
| 2006/0097062 A1 | 5/2006 | Cheong et al. | |
| 2006/0098241 A1 | 5/2006 | Cheong et al. | |
| 2008/0252066 A1 | 10/2008 | Rapoport et al. | |
| 2010/0034380 A1* | 2/2010 | Lee | H04N 1/4486 |
| | | | 380/243 |
| 2010/0066874 A1 | 3/2010 | Ishiga | |
| 2011/0101088 A1 | 5/2011 | Marguerettaz et al. | |
| 2014/0270512 A1 | 9/2014 | Mesh-Iliescu et al. | |
| 2016/0012611 A1 | 1/2016 | Wexler et al. | |
| 2016/0062612 A1 | 3/2016 | Chum et al. | |
| 2016/0148083 A1 | 5/2016 | Osborne et al. | |
| 2016/0292486 A1 | 10/2016 | Prusik et al. | |
| 2017/0318301 A1* | 11/2017 | Li | H04N 19/70 |
| 2017/0339430 A1 | 11/2017 | Kalevo | |
| 2017/0344776 A1 | 11/2017 | Sharma et al. | |
| 2019/0018994 A1* | 1/2019 | Teraura | G06K 7/10742 |
| 2019/0108618 A1 | 4/2019 | Hwang et al. | |
| 2019/0205668 A1 | 7/2019 | Noda et al. | |
| 2020/0226762 A1 | 7/2020 | Milovanovic et al. | |
| 2020/0366893 A1 | 11/2020 | Leleannec et al. | |
| 2021/0035331 A1 | 2/2021 | Xie et al. | |
| 2021/0133522 A1 | 5/2021 | Chang et al. | |
| 2021/0158096 A1 | 5/2021 | Sinha | |
| 2021/0200501 A1 | 7/2021 | Stankoulov | |
| 2021/0200969 A1 | 7/2021 | Walters et al. | |
| 2021/0201098 A1 | 7/2021 | Walters et al. | |
| 2021/0201099 A1 | 7/2021 | Walters et al. | |
| 2021/0304389 A1 | 9/2021 | Li et al. | |

FOREIGN PATENT DOCUMENTS

| | | |
|---|---|---|
| JP | 2017027583 A | 2/2017 |
| WO | 2016133911 A1 | 8/2016 |

* cited by examiner

ENCODED DATA ALONG TAPE BASED ON COLORSPACE SCHEMES

RELATED APPLICATIONS

This application is a continuation of U.S. patent application Ser. No. 16/592,705, titled "ENCODED DATA ALONG TAPE BASED ON COLORSPACE SCHEMES" filed on Oct. 3, 2019. The contents of the aforementioned application are incorporated herein by reference in their entirety.

BACKGROUND

Since time immemorial, certain materials (e.g., paint, ink, and/or the like) have been used to memorialize scenes and/or objects into semi-permanent to permanent mediums. Computer technologies allow for digitization and detections of these images embedded on these mediums and have introduced image processing as a technical field. Detection of images and revealing information associated therewith constitutes at least one aspect of image processing and have applications in a number of cases.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

One aspect of the present disclosure includes an apparatus for encoding and transmitting data pursuant to one or more colorspace schemes. The apparatus includes: a memory to store instructions, and processing circuitry, coupled with the memory, operable to execute the instructions, that when executed, cause the processing circuitry to: receive a first colorspace, convert the first colorspace to a second colorspace, determine a first color-channel associated with a maximum of the second colorspace and a second color-channel associated with a minimum of the second colorspace, encrypt a plurality of data on a tape, where the encryption is based on a plurality of color-channels between the first color-channel and the second color-channel, and where the second colorspace determines a key for decrypting the encrypted plurality of data.

Another aspect of the present disclosure includes a method for decoding encoded data received along a physical medium. The method includes: scanning a tape contained an encrypted plurality of data, where the encrypted plurality of data encrypted is encrypted based on a conversion from a first colorspace to a second colorspace, where the first colorspace is a distinct type of colorspace in relation to the second colorspace, and where the second colorspace is associated with a plurality of color-channels, and decrypting, by a computer processor and based on the scanning, the encrypted plurality of data, where the decryption is based on a decryption cipher, and where the decryption cipher is based on the second colorspace.

Yet another aspect of the present disclosure includes an article of manufacture, where the article of manufacture includes: a tape including alternating segments of a plurality of encoded data, where each encoded segment is encoded based on a color-space conversion from one color-space to another colorspace, and where at least two alternating segments are associated with a distinct key for decrypting the respective encoded data portion associated with each of the at least two alternating segments, and where a first of the distinct keys is based on a first colorspace conversion and where a second of the distinct keys is based on a second colorspace conversion, and where the first colorspace conversion is distinct from the second colorspace conversion.

DETAILED DESCRIPTION

Figure 1:
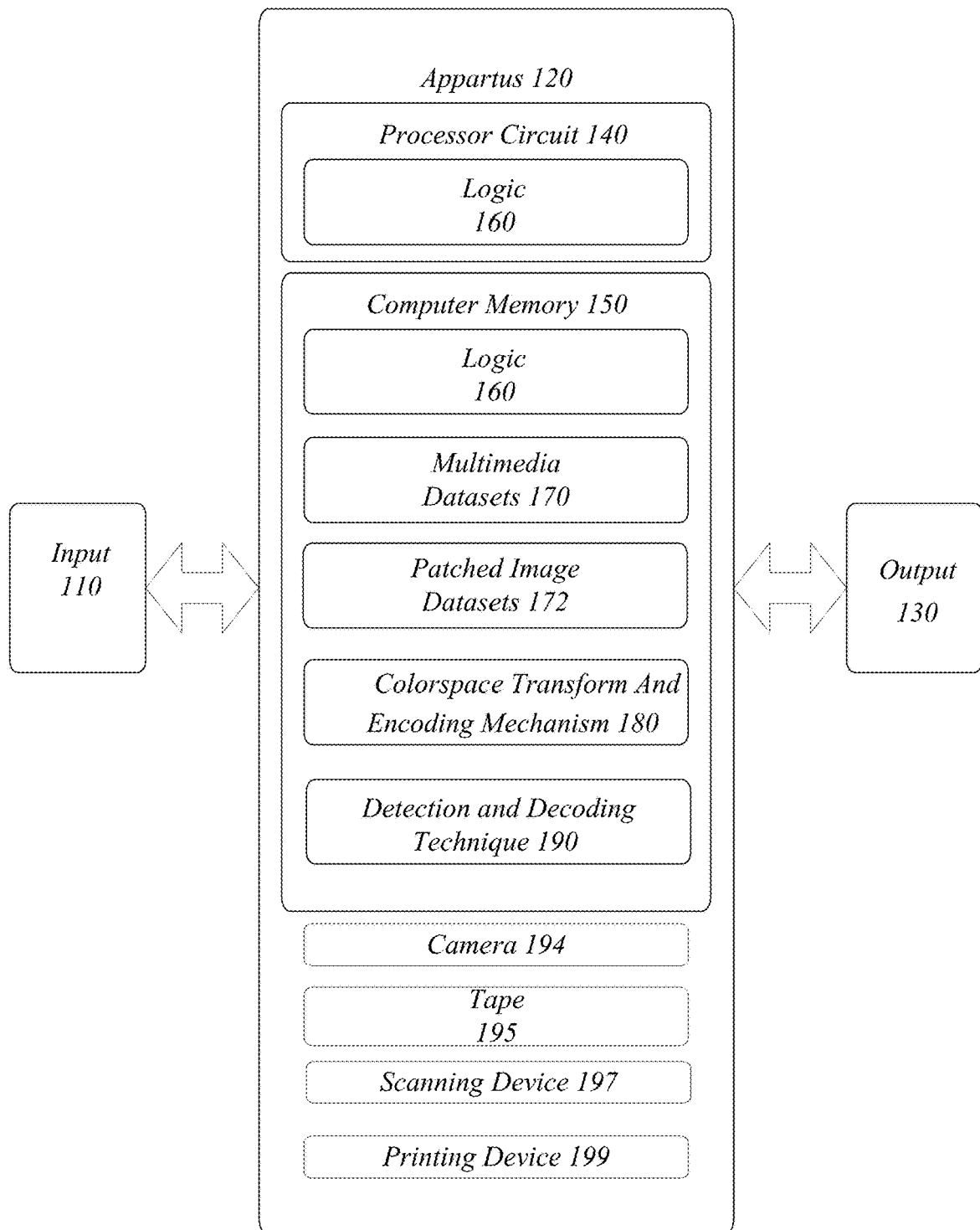
FIG. 1 illustrates an embodiment of a system to encode, transmit, and/or decode data along a physical medium, pursuant to at least one colorspace conversion scheme, and in accordance with at least one embodiment of the present disclosure.

Various embodiments are directed to securely encoding, transmitting, and decoding data via a suitable physical medium, such as a tape (e.g. any suitable industrial tape or tape reel that can be used for the encoding and/or decoding of multimedia data, such as audio, video, or other type of data and using any suitable technique to do so, e.g. magnetic storage and encoding). Various embodiments of the present disclosure offer one or more advantages in terms of both data compression and security. In terms of compression and transmission, and pursuant to various embodiments, more data can be encoded in the suitable physical medium at least because one or more colorspace conversions can encode more information on one or more color-channels, e.g. a color-channel, for example, representing a color such as purple can represent two different colors (blue and red), where each represented color represents at least one bit of data. In terms of security, and pursuant to various embodiments, the data is encoded based on the one or more colorspace conversions, with a cipher being defined by the mathematical definitions, e.g. keys, governing or defining the one or more colorspace conversions. In various embodiments, the cipher is dynamic and may be changed after a successful transmission or encoding of data, with a device, e.g. a server, tape head, other equivalent device, and/or any suitable combination thereof, updating one or more nodes (and associated processing devices connected to those nodes) of the change, which adds an additional layer of security along the physical medium, e.g., overall tape or tape reel.

In various embodiments, the use of tape provides an additional advantage, in that the cipher or key associated with the encoding and decoding can update the cipher or key associated with encryption in real-time, e.g. an analog type update. For example, as tape moves through one node of an overall transmission or encoding system, each portion of the tape can receive a different encoding based on a color-space conversion, and a node responsible for decoding that section may receive the appropriate key to decipher that particular tape segment. This can increase both the efficiency and security of the overall encoding and decoding process.

In various embodiments, colorspace models are configured to represent color data and encode data based on one or more color-channels, but most models differ in their representation of that color data (and by extension the color-channels that will be associated with the encoded data). For instance, the CIELAB or LAB colorspace model represents color as three values: L for the Luminance/Lightness and Alpha (A) and Beta (B) for the green-red and blue-yellow color components, respectively. The LAB colorspace model is typically used when converting from a Red-Green-Blue (RGB) colorspace model into Cyan-Magenta-Yellow-Black (CMYK).

Depending on the application, one colorspace may be preferable for transmitting and/or encoding data, and in various embodiments, converting between colorspaces can be advantageous. In various embodiments, whether information is converted to an initial colorspace (e.g. represented by colors associated with color-channels representing bits of data), or whether information is initially converted to an initial colorspace and then subsequent colorspaces, each colorspace conversion will be associated with a mathematical description of the color-channels defining that colorspace, e.g. one or more equations or values (such as a tristimulus system in RGB or XYZ), where those mathematical relationships can serve both as a means of encoding and decoding data. Accordingly, various embodiments will use one or more variations of a theme of using at least one colorspace scheme to print, encode, transmit, and decode data along a physical medium, such as a tape or tape reel. The transmitted data can be any suitable data including but not limited to financial data or information, multimedia data or information, security data or information, or any other data or information that may be suitable for transmission.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines may appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

FIG. 1 illustrates a block diagram for a system 100. Although the system 100 shown in FIG. 1 has a limited number of elements in a certain topology, it may be appreciated that the system 100 may include more or fewer elements in alternate topologies as desired for a given implementation. The system 100 may implement some or all of the structure and/or operations for the system 100 in a single computing entity, such as entirely within a single device.

The system 100 may comprise an apparatus 120. The apparatus 120 may be generally arranged to process input 110 at one node of a physical medium (shown in greater detail with respect to FIG. 2 and FIG. 3), such as a tape head associated with a tape reel, transmitter, receiver, tape printing/encoding/decoding device or any other suitable device for printing, encoding, magnetically or otherwise, and/or decoding information on tape, using various components and generate (some) output 130 at another node along the physical medium (shown in greater detail with respect to FIG. 2 and FIG. 3), such as another tape head, tape drive, recorder, transmitter or tape printing/encoding/decoding device or suitable other suitable transmitter or receiver. The apparatus 120 may comprise a processor 140 (e.g. processing circuit) and computer memory 150. The processing circuit 140 may be any type of logic circuit and the computer memory 150 may be a configuration of one or more memory units.

The apparatus 120 further includes logic 160 stored in the computer memory 150 and executed on the processing circuit 140. The logic 160 is operative to cause the processing circuit 140 to encode, e.g. represent, one or more datasets 172 (received as an input at 110 and stored in memory 150) pursuant to one or more colorspaces and/or colorspace conversions using a colorspace transform and encoding mechanism 180 resulting in encoded datasets 182. In various embodiments, the logic 160 is operative to process and/or receive the one or more datasets 172 as color data at input 110, e.g. process color data received at a physical medium receiver or transmitted, e.g. a tape reel, transmitter, receiver, tape printing/encoding/decoding device or any other suitable device for printing, encoding and/or decoding information on tape, based on the colorspace defining the received data.

In various embodiments, the logic 160 is further operative to cause the processing circuit 140 to apply a colorspace transform and encoding mechanism 180 to one or more datasets 172, e.g. financial data or information, multimedia data or information, security data or information, or any other data or information that may be suitable for transmission, where datasets 172 may be received as an input at 110 (and stored in memory 150) along a node, e.g. a tape drive, recorder, or other suitable device, of a physical medium, such as constant reel of tape. In various embodiments, the colorspace transform and encoding mechanism 180 may process or receive datasets 172 at input 110 according to signals representing a first colorspace and represented by color-channels associated therewith, e.g. an RGB colorspace, and may convert the first colorspace to a second colorspace, e.g. LAB or XYZ, in order to transform the datasets 172 into encoded (or encrypted) datasets 182, e.g. an encoding takes place based on a converting from a first colorspace to a second colorspace that is different than the first colorspace, and where the conversion to the second colorspace defines the encoding scheme. In various embodiments, the mathematical definition of the second colorspace defines the encoding or encryption scheme in whole or in part, where one or more color-channels of the second colorspace contains provides for and contains the encoded data as one or more signals encoded and/or transmitted along a physical medium, e.g. tape 195. In various embodiments, more than colorspace conversion and to multiple different colorspaces may take place, where each conversion may (but need not) represent a layer of encryption defined by the mathematical definition of the converted-to colorspace or colorspaces.

In various embodiments, as stated above, the logic 160 may be configured to cause processor 140 to convert datasets 172 from electrical signals into signals, e.g. magnetic signals encoded on a first part of a tape, at an input 110, e.g. tape head, tape drive, recorder, or suitable other suitable device, where the conversion may convert the data according to a colorspace scheme, e.g. RGB channels of an RGB colorspace, and where the colorspace transform mechanism 180 may convert that first colorspace into a second and different colorspace and, in various embodiments, the second colorspace into a third and different colorspace, etc. In various embodiments, whether the datasets 172 were received as electrical signals and converted into other signals with one or more colorspace conversions were performed in association therewith or whether the data were received as a direct encoding with one or more colorspace conversions performed in association therewith, the encoding and colorspace transform mechanism 180 provides for an encoding scheme for compressing and encoding the datasets 172 in a suitable manner for encoding and transmission via a physical medium, such as tape 195.

In various embodiment, one or more colorspace models, and as may be related to one or more colorspace conversions, as described herein may refer to any suitable colorspace model, such as Red-Green-Blue (RGB), Cyan-Magenta-Yellow-Black (CMYK), Luminance-Alpha-Beta (LAB), XYZ, and/or the like, where each channel in the model can represent a bit of data. For example, the Alpha and Beta channels of the LAB colorspace model refer to green-red and blue-yellow color components, respectively. The green-red component may represent a variance between red and green with green in the negative direction and red in the positive direction along an axis and the blue-yellow component may represent a variance between blue and yellow with blue in the negative direction and yellow in the positive direction along an axis. In various embodiments, a predefined range of values associated with each color-channel, e.g. a color value of a color associated with the color-channel, may represent a first bit value, e.g. "1," and a second range of values may represent a second bit value, e.g. a "0," from an encoding scheme perspective. As such, as the number of color-channels is increased, the overall encoding capacity may increase as well.

In various embodiments, a colorspace is associated with one or more color-channels, with various examples of color-channels in relation to individual colorspaces being provided for above and elsewhere herein. In various embodiments, a color-channel is a distribution of colors with a first color and second color of first and second highest prevalence, respectively, where the first color becomes a minimum in the color-channel and the second color becomes the maximum such that the boundary may be a transition between these colors, where this minimum and maximum scheme may be with respect to a colorspace that is converted thereto from another colorspace, e.g. a second colorspace part of a colorspace conversion from a first colorspace. This boundary may be at least one pixel where the color changed from the first to the second color or vice versa. If the first color is set to zero (0) and the second color is set to two hundred and fifty-five (255), then, mathematically, this boundary may be located at pixel(s), light components, or other physical manifestations reflecting of values that jumped between the minimum and maximum color value; for example, there may be sharp division (i.e., thin boundary) in which at least two (or portions of) signal representations, or other physical manifestations reflecting the light transition immediately between 0 and 255. In various embodiments, as alluded to above, a range of values within a color-channel may constitute a bit value of "1," e.g. 128-255, and a range of values within a color-channel may constitute a bit value of "0", e.g. 0-127. In various embodiments, color-channels, e.g., "R," "G," and "B" define a colorspace such as RGB (e.g., a first colorspace based on a tristimulus system), and in various embodiments custom color-channels can be created using a (second) tristimulus system associated with and defining an XYZ (second, e.g. converted-to, colorspace).

In various embodiments, a single color-channel may contain more than one bit of data, e.g. at least two distinct bits of data representing at least two colors associated with a color-channel from; for example, if a conversion between a first colorspace containing one or more colors, e.g. red and blue, into a second colorspace takes, then the second colorspace may contain a single color-channel, e.g. purple, that contains data from both color-channels of the first color-channel, e.g. "red" and "blue." Accordingly, in various embodiments, a single color-channel can contain a superposition of information, with values of the color-channel representing more than one bit of data, as the converted-to or second colorspace and associated color-channel(s) may be a combination of colors from the first colorspace each containing or associated with a bit of data. In various embodiments, the superposition of colors into a single color-channel may result in multiple bits along a larger set of values of that color-channel, e.g. a color-channel such as purple may be between 0 and 510, where multiple bits may be represented between the values, e.g. if two colors are represented by purple associated with a converted-to XYZ space (or other suitable colorspace) (from a converted-from colorspace), two bits of data may be represented by the purple channel with four ranges along the range capable of determining a "0" or "1" value for the two bits. In various embodiments, in instances where multiple bits are represented by a color-channel, a cipher and/or key may provide the ordering of the bits, e.g. the order that information is to be sequenced from the ranges of the color-channels (the cipher may provide additional information, e.g. the definition of the colorspace conversion and the ordering or sequencing associated with multiple color-channels).

Accordingly, in various embodiments, the colorspace and encoding mechanism 180 may perform a colorspace conversion from one colorspace, e.g. a first colorspace, such as RGB, representing data sets as a plurality of signals, into at least one other different colorspace representing an encoded version of the datasets as another plurality of signals, e.g. signals according to a second (or more) colorspace, e.g. XYZ or LAB, such that at least one color-channel of the second colorspace represents at least two colors and/or color-channels associated with the first colorspace. In various embodiments, the conversion or conversions may result in superior compression and encoding for the conversion from datasets 172 into encoded datasets 182 as the encoded data sets 182 are encoded and transmitted along the tape at least because a single color-channel of the converted-to colorspace or colorspace may represent multiple colors or color-channels from the converted-from colorspace.

In various embodiments, the colorspace and encoding mechanism 180 may be based on multiple colorspace conversions, where a second (or additional) conversion(s) may be done to enhance compression and facilitate superior encoding of the encoded data 182 representing datasets 172 and encoded and/or transmitted along a physical medium, such as tape 195. In various embodiments, the color-channels of any of the colorspaces may be greater than three, e.g. colors that are imperceptible to the human eye can be used. In various embodiments, one a tape reel, transmitter, receiver, tape printing/encoding/decoding device or any other suitable device for printing, encoding and/or decoding information on tape can implement one or more colorspaces with at least one-thousand or more distinct color-channels, where in various embodiments, there can be sixty-four bits or more of data per colorspace, with each color-channel containing encoded information and at least one color-channel containing color-channels from a converted-from colorspace, e.g. information associated with encoded datasets 182.

In various embodiments, as described herein, depending on the hardware and/or software components selected with respect to nodes associated with the tape 198, e.g. tape heads, tape drives, recorders, transmitters, receivers, or other suitable device, one colorspace model (e.g. XYZ) may correspond to a higher likelihood of success in terms of being generated, encoded and transmitted and/or detected and decoded than another colorspace. Accordingly, in various embodiments, the colorspace and associated colors selected for the encoding scheme of the datasets 172 can be selected with optimization of encoding, transmitting, scanning, and decoding in mind.

In various embodiments, the logic 160 is further operative to cause the processing circuit 140 to apply an additional encoding mechanism 170 to datasets 172 unrelated to colorspace transformations, prior to or after performing the colorspace conversion and encoding associated with the colorspace transform and encoding mechanism 180. For example, the encoding mechanism 170 may perform PGP encryption on datasets 172 before any component converts them to a signal for encoding on tape and/or before performing any colorspace conversion in association therewith. The additional layer of encryption may further enhance compression and provide additional security for the encoded data 182 as it is encoded on the physical medium, e.g. tape.

In various embodiments, the logic 160 is further operative to cause the processing circuit 140 to apply a detection and decoding mechanism 190 at any suitable node or point along a physical medium carrying the encoded data, e.g. tape head, tape drive, recorder, or suitable other suitable device. The detection and decoding mechanism 190 may cause a receiving device to apply various sensors and/or decoders associated with magnetic encodings, with each associated with the detection of one or multiple color-channels to detect and decode the encoded data along the tape, where the multiple color-channels are part of the signals encoded on the tape 195 and associated with the encoded data 182. In various embodiments, not all of the color-channels associated with the signals carrying encoded data 182 contain the encoded data 182, which may increase the security of the transmission and encoding techniques.

In various embodiments, the detection and decoding mechanism 190 may utilize a cipher 188 to decode or decrypt the encoded data 182, e.g. the detection and decoding mechanism 190 may instruct suitable hardware or software components associated with a tape node, e.g. tape head, tape drive, recorder, or suitable other suitable device, to decode the encoded data 182.

In various embodiments, the cipher 188 may provide the tape reel, transmitter, receiver, tape printing/encoding/decoding device or any other suitable device for printing, encoding and/or decoding information in relation to the tape 195 with i) the key defining the one or more colorspace conversions, e.g. mathematical definition of at least one of the colorspaces that are converted to, including a final colorspace of one or more colorspace conversions, and by extension the color-channels that contain or are associated with encoded data 182, including superimposed colors or color-channels associated with a converted-from colorspace; ii) the order or sequencing of information, e.g. color values or range values, of data associated with the color-channels containing the encoded data 182, e.g. the bit order or sequencing of the color values of a particular color-channel; iii) the order or sequencing of the color-channels containing the encoded data with respect to one another, e.g. the bit sequence that bits are to be ordered between and amongst color-channels; iv) the timing at which a sensing or detection should occur, e.g. the logic 160 may instruct processor to cause a transmitter to transmit signals with no data for defined or random intervals (or intervals based on a processing threshold at one or more nodes) throughout the transmission line, and as such, the cipher 188 may provide the timing to scan data containing signals actually carrying the encoded data 182; v) information, based on a defined setting of colorspace changes along the tape, e.g. such as those based on distance between various segments of the tape 195, and different color-distributions and colorspaces in relation thereto; vi) key-frame information, rotation rate information, and/or rotational direction of the colorspace distributions (and by extension associated conversions) of various segments of the tape, where, in various embodiments, the key-frame information can be governed by any suitable technique or combination of techniques, including interpolation, splines, Bezier and Hermite techniques, and/or any other technique or combination or technique that accounts for distance, time and/or velocity of the tape 195 as it moves through the tape reel, transmitter, receiver, tape printing/encoding/decoding device or any other suitable device for printing, encoding and/or decoding information in relation to the tape 195; and/or vii) any decryption technique that may be applied to a non-colorspace encryption technique applied to datasets 172, such as PGP encryption.

In various embodiments, as stated above, the colorspace conversion from one colorspace to another colorspace forms part of the basis for encrypting, e.g. by the colorspace transform and encoding mechanism 180, the datasets 172 into encrypted or encoded datasets 182, and by extension the decoding or decryption of the encrypted or encoded datasets 182. Accordingly, the encryption or encoding and decryption or decoding, may be based in part on the key or mathematical relationship defining the relevant colors and color-channels of the colorspace and associated with one or more colorspace conversions. For example, if the colorspace scheme associated with the image is an XYZ colorspace, then one or more color-channels of the XYZ colorspace are defined by a tristimulus scheme, that includes at least one chromacity value, e.g. "x", and at least one luminance value, e.g. "y":

$$x = X/(X+Y+Z),$$

$$y = Y/(X+Y+Z),$$

$$z = Z/(X+Y+Z). \quad \text{Equation 1}$$

This means that one or more color-channels are defined by the above equation and can be used to create one or more color-channels in the XYZ colorspace, including colors and color-channels imperceptible to the human eye, and the above equation may also provide, in part, the basis for cipher 188 to allow a component to decode or decrypt the encrypted data 182.

In various embodiments, the encoding may be such that x, y, and z may have certain values that define the particular color-channels associated with the space, and pre-defined color range values within the channel may determine whether the channel represents a "1" or a "0" bit value (or bit values in the instance where a color-channel represents multiple bit values by superimposition). Without knowing the initial x, y, and z values of the various color-channels, decoding the encrypted data 182 may not be possible, and this feature can be amplified, in various embodiments, by having a receiver or transmitter, e.g. a tape drive, recorder, or other suitable receiver or transmitter or tape printing/encoding/decoding device, print or generate blank portions of tape and/or encode portions of the tape with material that does not have any data.

Accordingly, the equations governing the particular colorspace, of which the above is one example and for one colorspace conversion or conversions, provide the basis for encoding the datasets 172 into encoded data 182 suitable for transmission and/or printing along a physical medium, such as tape 195, and also the basis for decoding encoded data 182 at a suitable point along the physical medium, e.g. a tape reel, transmitter, receiver, tape printing/encoding/decoding device or any other suitable device for printing, encoding and/or decoding information on tape.

Accordingly, one node of a physical medium associated with input 110, e.g. a tape reel, transmitter, receiver, tape printing/encoding/decoding device or any other suitable device for printing, encoding and/or decoding information on tape may be configured by apparatus 120 to encode one or more datasets 172 using the mathematical relationship governing a colorspace, e.g. Equation 1, which in turn determines, in part or in whole, a cipher 188 that can decode or decrypt the encoded data 182 at an output 130, e.g. a tape reel, transmitter, receiver, tape printing/encoding/decoding device or any other suitable device for printing, encoding and/or decoding information on tape, which can decode or decrypt the encoded data based on the mathematical relationship or key, e.g. Equation 1, defining the colorspace conversion.

In various embodiments, cipher 188 is an alternating cipher 188 that may be dynamically updated by the colorspace transform and encoding mechanism 180 during each transmission of data, during a predefined time interval, or based on a defined distance setting or setting with respect to one or more portions along the tape. The update may include any modification that changes the relevant information necessary for decryption or decoding (e.g. changing the nature of encoding or encryption) including i) changing which color-channels of the converted-to colorspace contain the encoded data 182; ii) changing the nature, if any, of any superimposition of a converted-from color-channel or color as represented in the color-channels of the converted-to color-channels; iii) changing the order or sequencing of information, e.g. color values or range values, of data associated with the color-channels containing the encoded data 182, e.g. the bit order or sequencing of the color values of a particular color-channel; iv) any encryption applies to the encoded data 182 based on a non-colorspace encryption technique applied to datasets 172, such as PGP encryption, including changing or eliminate the non-color based encryption; v) changing the timing at which a sensing or detection should occur (based on a timing or processing threshold at a node; vi) changing the range values of one or more color-channels contained or associated with encoded data 182 by performing a mathematical operation on value ranges of the one or more color-channels, such as an addition, multiplication, division or other suitable operation that would affect the range values defining bit values in that color-channel or color-channels; vii) using a completely different colorspace conversion to represent a first transmitted portion of encoded datasets 182, e.g., a portion of datasets 172 are associated and transmitted with a colorspace conversion that culminates in the XYZ space and a subsequent transmission is governed by a different culmination (and by extension a different mathematical equation or key defining the conversion and converted-to colorspace) of a colorspace conversion, e.g. LAB, with respect to another portion of datasets 172 as represented by another portion of encoded datasets 182; viii) accounting for distance information, based on a defined setting of colorspace changes along the tape, e.g. such as those based on distance between various segments of the tape 195, and different color-distributions and colorspaces in relation thereto; and/or ix) accounting for key-frame information, rotation rate information, and/or rotational direction of the colorspace distributions (and by extension associated conversions) of various segments of the tape, where, in various embodiments, the key-frame information can be governed by any suitable technique or combination of techniques, including interpolation, splines, Bezier and Hermite techniques, and/or any other technique or combination or technique that accounts for distance, time and/or velocity of the tape 195 as it moves through the tape reel, transmitter, receiver, tape printing/encoding/decoding device or any other suitable device for printing, encoding and/or decoding information in relation to the tape 195. In various embodiments, for example, a portion of datasets 172 may be encoded and form a portion of encoded dataset 182 on a first portion of the tape 195 based on a first set of one or more colorspace conversions and another portion of datasets 172 may be encoded pursuant to a different one or colorspace conversions performed by the colorspace transform and encoding mechanism 180 on a second portion of the tape 195.

In various embodiments, the detection and decoding mechanism 190 may update the cipher 188 when the encoding mechanism and 180 changes the encryption technique with the relevant key, e.g. mathematical relationship defining the converted-to colorspace, thus permitting proper decoding and decryption at output 130, e.g. a tape reel, transmitter, receiver, tape printing/encoding/decoding device or any other suitable device for printing, encoding and/or decoding information on tape.

Accordingly, various embodiments of the present disclosure include a tape 195 that can include alternating segments of a plurality of encoded data, where each encoded segment is encoded based on a first color-space conversion from one color-space to another colorspace, and where at least two alternating segments are associated with a distinct key for decrypting the respective encoded data portion associated with each of the at least two alternating segments. In various embodiments, a first of the distinct keys is based on a first colorspace conversion and where a second of the distinct keys is based on a second colorspace conversion, and where the first colorspace conversion is distinct from the second colorspace conversion.

In various embodiments, and as discussed in more detail with respect to one or more embodiments provided below, if the initial or subsequent (in instances where multiple colorspaces and conversions thereto or therefrom are used) colorspace has a luminance factor, such as an XYZ colorspace, the luminance factor may be temporarily filtered out when determining the various chromacity values desired for use with encoded datasets 182.

In various embodiments, the luminance factor, e.g. "y" of Equation 1, may be reintroduced (or used from the outset if it was never filtered out), to define tangential information related to the encoded data 182, such as an error correcting code, e.g. Hamming code. Accordingly, in various embodiments, logic 160 may be further operative to cause the processing circuit 140 to configure the colorspace conversion and encoding mechanism 180 to encode tangential data based on a brightness value of encoded signals on the tape 195 e.g. a range of brightness values correspond to a "1" bit value (brightness higher than or equal to a certain value) and a range of values correspond to a "0" bit value (brightness less than a certain value). In various embodiments, logic 160 may be further operative to cause the processing circuit 140 to configure the detection and decoding mechanism 190 to associate particular data encoded along the tape 195, and distinct from the datasets 172 (and by extension encoded datasets 182) in relation to the luminance value (brightness strength of encoded material on the tape 195 and associated with encoded datasets 182).

In various embodiments, the logic 160 is further operative to cause the processing circuit 140 to identify which colorspace model to use in encoding and transmitting a given image prior to the colorspace transformation and encoding mechanism 180 performs the encodings, e.g. optimizing which colorspace conversion to perform based on the capabilities of the hardware, e.g. transmitting and sensing devices of the nodes along the physical medium. For example, the logic 160 is further configured to cause the processing circuit 140 to apply the colorspace transformation and encoding mechanism 180 to transform datasets 172 into encoded datasets 182 by converting from one colorspace representing datasets 172, e.g. RGB, into another colorspace model (e.g. XYZ), where the other or second colorspace model has a higher likelihood than the first colorspace model at detection at an output node, e.g. output 130 such as a tape reel, transmitter, receiver, tape printing/encoding/decoding device or any other suitable device for printing, encoding and/or decoding information on tape. It is appreciated that the other colorspace model may be any colorspace model including those with a different number of channels than the first colorspace model.

The one or more colorspace models as described herein, as stated and implied elsewhere herein, refers to any suitable colorspace model, such as colorspace employing a tristimulus system or scheme, the Red-Green-Blue (RGB), the Luminance-Alpha-Beta (LAB), an XYZ colorspace, and/or the like and/or variations of the same. Similarly, although various embodiments may refer to a particular conversion from one specific colorspace to another specific colorspace, conversions between other colorspaces are contemplated and consistent with the teachings of the present disclosure.

In various embodiments, the system 100 can include one or more of a camera or video device 194, where both device 194 and device 197 can be any suitable device for obtaining, capturing, editing, and/or scanning images, including but not limited to video or camera pictures, of objects, entities, and/or environments, and where device 194 and 197 can include one or more functionalities of a tape head associated with a tape reel, transmitter, receiver, tape printing/encoding/decoding device or any other suitable device for printing, encoding, magnetically or otherwise, and/or decoding information on tape, and/or where device 194 and 197 may be associated with one or both of input 110 and output 130. The logic 160 can be configured to capture or scan images of a particular object, entity or environment using device 195 and/or device 197, where the captured images can become part of image datasets 172 and used for determining suitable colorspaces, performing colorspace conversions, and/or scanning images determined from colorspace conversions, as may be consistent with the teachings provided herein, including selecting an optimal colorspace for an encoded multimedia scheme and/or an environment associated with the scanning thereof. The system 100 can further includes a printing device 199 for printing encoded data on a physical medium, such as tape 195, where device 199 can include one or more functionalities of a tape head associated with a tape reel, transmitter, receiver, tape printing/encoding/decoding device or any other suitable device for printing, encoding, magnetically or otherwise, and/or decoding information on tape, and/or where device 199 may be associated with one or both of input 110 and output 130.

Figure 2:
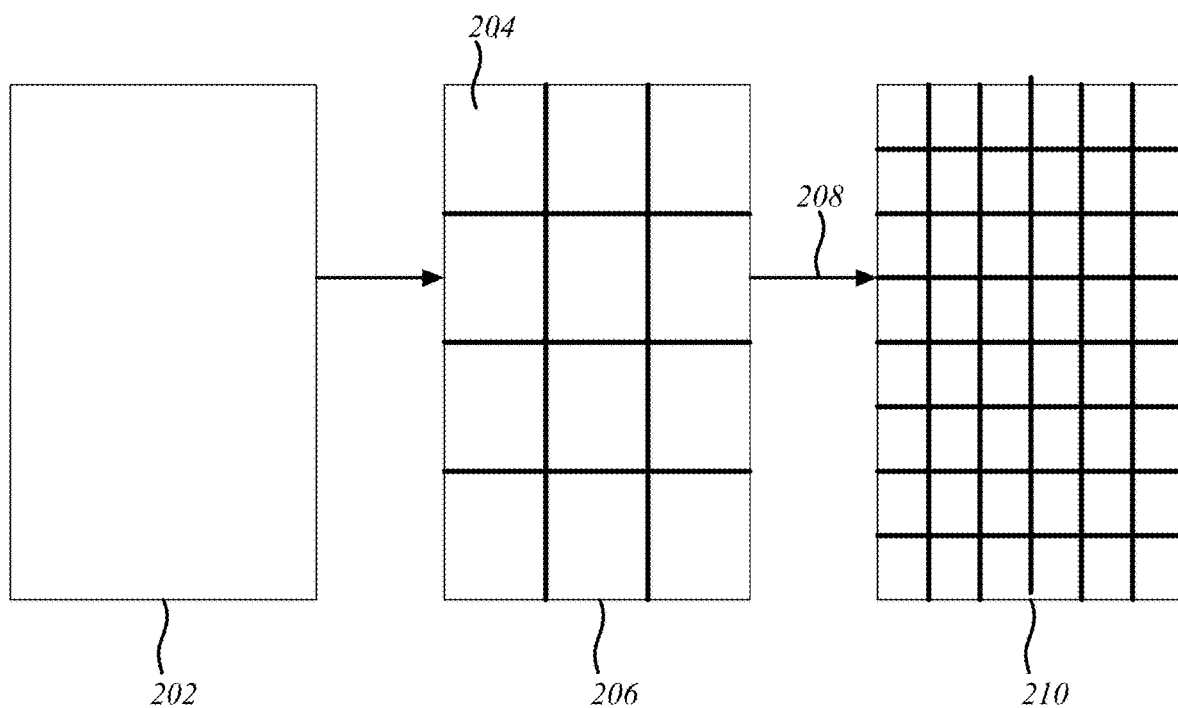
FIG. 2 illustrates an embodiment of a clustering process for the system of FIG. 1 and in accordance with at least one embodiment of the present disclosure.

FIG. 2 illustrates an embodiment of a clustering process 200 for the system 100. The clustering process 200 operates on image datasets (e.g., the data sets 170 and/or image datasets 172 of FIG. 1) storing color data for images.

In some embodiments of the clustering process 200, color data 202 of an image undergoes a patching operation where the image is processed into a plurality of patches 204 of patched image data 206. Each patch 204 of the patched image data 206 includes color data in accordance with a colorspace model, such as pixel data having RGB tuples, where the pixel may represent an encoded representation of multimedia data. The clustering process 200 further processes the patched image data 206, via a transformation operation 208, by applying a colorspace transform mechanism on the color data of the patched image 206 to transform patched image data into transformed image data of a transformed image 210, where the transformed image may also represent an encoded representation of multimedia data. The color data of the patched image 206 is configured in accordance with the colorspace model and new color data for the transformed image 210 is generated according to another colorspace model.

In some embodiments, the clustering process 200 performs a mini-colorspace transform for at least one patch of the patched image 206, possibly leaving one or more patches without a transformation. Via the transformation operation 208, the mini-colorspace transform modifies the color data in the at least one patch to transform patched image data into transformed image data of a transformed image 210. The clustering process 200 may perform stitching between patches to make the patched image 206 uniform as opposed to creating artificial edges.

Figure 3:
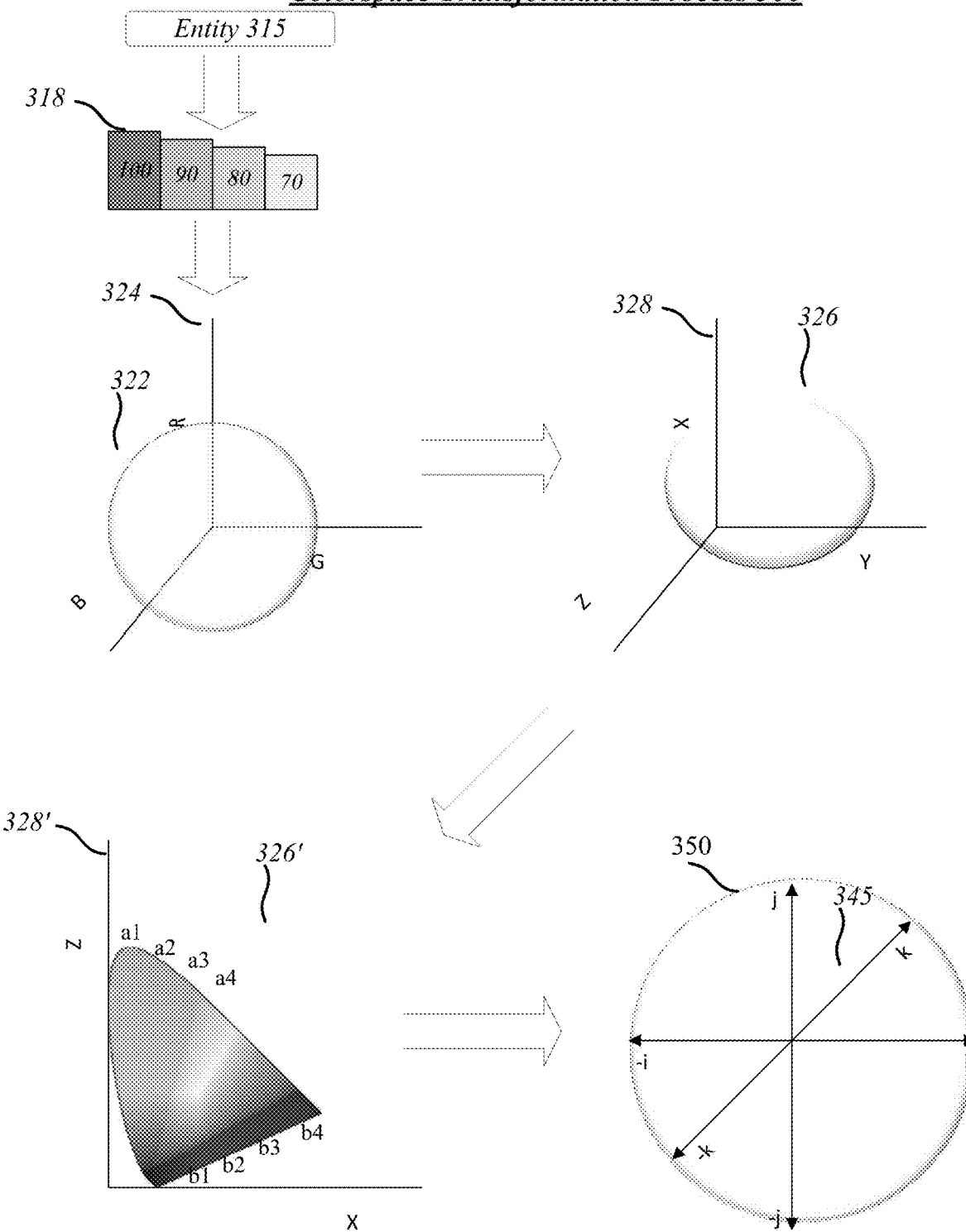
FIG. 3 illustrates an embodiment of a colorspace conversion technique useful for encoding and/or decoding data, including by the system of FIG. 1, and in accordance with at least one embodiment of the present disclosure.

FIG. 3 illustrates an example of a colorspace conversion scheme 300 in accordance with various embodiments of the present disclosure. A histogram 318 representation of a particular environment 315 is provided (where the numbers 100, 90, 80, and 70 are intended to represent a simplified version of colors distribution values of one or more colors representing the particular object, entity, or environment 315), where the environment 315 may be associated with a scan of printable material representing encoded data of any kind, e.g. portions of a tape 195 with encoded data thereon, where in various embodiments the data is multimedia data (e.g. video data, audio data, image data, spatial data (which can create three-dimensional renderings), etc.). The histogram 318 can be generated by having one or more components of system 100 performing a scan of the environment 315 and generating a histogram 318 of the most prevalent colors, least prevalent colors, or absent colors of the environment 315. In one or more embodiments, the histogram 318 can be of four, six, eight or more colors of the most prevalent colors of the object, entity, environment, or other scheme associated with data to be encoded. Since various embodiments of the present disclosure expressly contemplate using colors imperceptible to the human eye, there is no limitation on the number of colors that can be used with respect to the histogram 318, the colorspace conversions discussed herein, or any images generated from the colorspace conversions, including but not limited to image data providing an encoded representation of multimedia data (e.g. video data, audio data, image data, spatial data (which can create three-dimensional renderings), etc.), and can have in excess of four colors, six color, or eight colors, and four color-channels, six color-channels, or eight color-channels, where the colors and/or color-channels are distinct and different with respect to one another.

In various embodiments, one or more components of system 100 can determine the most prevalent colors associated with environment 315, and the resulting histogram 318 may be based on that determination. The histogram 318 can be used to map the most prevalent colors to a distribution 322 associated with a suitable colorspace 324, including but not limited to an RGB colorspace 324. In various embodiments, the colors of histogram 318 are mapped pursuant to the tristimulus values of the RGB colorspace, e.g., "R," "G," and "B." Any suitable mathematical conversion, e.g., linear-algebraic, etc. can be used to map the conversion to the RGB colorspace, e.g., convert the mapped RGB colorspace to another colorspace.

In various embodiments, the color-channels of distribution 322 may represent one or more bits of data for an encoded representation of data, e.g. multimedia data, where the data may be compressed or un-compressed.

In various embodiments, once the distribution 322 is mapped according to the RGB colorspace 324, one or more components of system 100 can convert the RGB distribution 322 to a new colorspace 326 with a distribution 328 pursuant to the new colorspace 326. Any suitable colorspace conversion can be used, including converting to an XYZ colorspace, where the conversion can be pursuant to any suitable mathematical conversions and equations that govern the XYZ colorspace, including suitable tristimulus conversions between RGB and XYZ. In various embodiments, "Y" represents a luminance value of the XYZ space and at least one of "X" and "Z" (or both) represent a chrominance value of the colorspace and an associated distribution, e.g. 326 plotted pursuant to the XYZ colorspace.

In various embodiments, the color-channels of new colorspace 326 may represent one or more bits of data for an encoded representation of data, e.g. multimedia data, where the multimedia data may be compressed or uncompressed. In various embodiments, the encoding is limited to the second conversion, e.g. only the color-channels of new colorspace 326 provide for an encoded representation of multimedia data. In various embodiments, both the color-channels of colorspace 324 and colorspace 326 provide for an encoded representation of multimedia data, whether compressed or uncompressed, thus providing for multi-level encryption.

In various embodiments, the luminance channel "Y" is filtered out resulting in colorspace 328' and distribution 326', which can assist in making determinations solely on actual chromatic values associated with the entity, object, or environment 315, without considering luminance (this is helpful at least because colors can be used that are imperceptible to the human eye). In various embodiments, four (or more) lines can be defined by points (a1, b1), (a2, b2), (a3, b3), and (a4, b4), and are selected to have a maximum distance apart with respect to distribution 326'. In various embodiments, the points a1, a2, a3, and a4 are selected to correspond to the most prevalent colors associated with entity, object, or environment 315 and b1, b2, b3, and b4 by extension, being opposite to those colors, may represent the least prevalent or absent colors in association with entity, object, or environment b1, b2, b3, b4. These lines may define vectors for a new colorspace conversion in an XYZ or other suitable colorspace 345 and may form the basis for new XYZ tristimulus values.

An image or image set, such as the patched image data 172 representing encoded data, e.g. multimedia data (e.g. video data, audio data, image data, spatial data (which can create three-dimensional renderings), etc.), as discussed above, can be made using colors associated with the new colorspace 350 and a distribution 345 of colors defined by color-channel vectors (i, −i), (j, −j), (k, −k), an additional color-channel and all other color-channels (omitted from display due to the limitations of three-dimensional space) associated therewith. In various embodiments, since the colors may correspond to less prevalent or absent colors in relation to where a potential scan may occur (or what is being scanned), e.g., printed material corresponding to encoded multimedia data in an environment with colors that have a maximum difference in relation thereto, edge detection is enhanced.

Alternatively, although not expressly shown, the maximum distance from the most prevalent colors to least prevalent colors can be determined, e.g., a1 to b1, a2 to b2, etc., and then lines can be drawn from b1, b2, b3, and b4 in a direction tangential, parallel or opposite a vector or direction associated with a1, a2, a3, and a4. The color-channel vectors (i, −i), (j, −j), (k, −k), an additional color-channel and all other color-channels (omitted from display due to the limitations of three-dimensional space) associated with colorspace 350 may be entirely colors absent and/or mildly prevalent in relation to entity, object, or environment 315, which can further enhance edge detection.

In various embodiments, the color-channels of new colorspace 350 may represent one or more bits of data for an encoded representation of data, such as multimedia data (e.g. video data, audio data, image data, spatial data (which can create three-dimensional renderings), etc.), where the multimedia data may be compressed or uncompressed. In various embodiments, the encoding is limited to the conversion associated with new colorspace 350, e.g. only the color-channels of new colorspace 326 provide for an encoded representation of multimedia data. In various embodiments, more than one of the color-channels of colorspace 324, colorspace 326, colorspace 328', and/or colorspace provide for an encoded representation of multimedia data, whether compressed or uncompressed, thus providing for multi-level encryption.

In various embodiments, whether luminance channel "Y" is filtered out or whether it remains unfiltered throughout one or more colorspace conversions, it may be used to provide an encoded representation of tangential information in relation to the encoded multimedia data, such as page orientation information, metadata, page numbers, and/or party bits (Hamming code). In various embodiments, where the luminance channel "Y" is filtered out in relation to colorspace 328', it can be reintroduced at any subsequent conversion when chromacity values have been determined, such as with respect to new colorspace 350, in order to provide for the luminance encoding feature in association with tangential information.

In various embodiments, when performing the colorspace conversion between 328' and 350, in addition to carrying out the algebraic or other suitable conversions associated with the XYZ colorspace, the color-channel vectors, e.g. (i, −i), (j, −j), (k, −k), may be orthogonal to one another by performing any suitable mathematical and/or orientation operation on the vectors and/or by selecting suitable points on colorspace 226' and distribution 228' when making the conversion. In various embodiments, a second maximum difference between one or more points can be taken in space 350, in addition to an orientation operation to center the distribution 345 along the axis of the newly defined color-channel vectors, e.g. (i, −i), (j, −j), (k, −k), such that the color-channel vectors are orthogonal and have a maximum distance in relation to one another. In various embodiments, performing at least one of the orthogonality operation, maximum determination, and/or orienting operation can further enhance edge detection of an image generated for scanning, such as an encoded multimedia scheme printed on a physical medium, e.g. tape 195, in relation to an entity, object, or environment 315 to be scanned.

In various embodiments, the various color-channels described above, including each vector, e.g. (−i, i), defines a first color that is a minimum in the color channel and the second color becomes the maximum, such that the boundary may be a transition between these colors. This boundary may be at least one pixel where the color changed from the first to the second color or vice versa. If the first color is set to zero (0) and the second color is set to two hundred and fifty-five (255), then, mathematically, this boundary may be located at pixel(s) that jumped between the minimum and maximum value; for example, there may be sharp division (i.e., thin boundary) in which at least two neighboring pixels transition immediately between 0 and 255. In various embodiments, the boundary is such it may be a transition between these colors where, as discussed above, one or more color-channel ranges are selected such that a maximum color value of one or more color channel corresponds to a unique color value, most prevalent color value, and/or highest color value of a target object, entity, and/or environment associated with a scan and the minimum color value of the color-channel corresponds to a most unique color, most prevalent color value and/or highest color value of the printed scheme corresponding to printed encoded data, e.g. multimedia data (e.g. video data, audio data, image data, spatial data (which can create three-dimensional renderings), etc.), where additionally, the most prevalent value and/or highest color value of the printed encoded multimedia data is also a least prevalent (lowest color value) and/or absent from the target object, entity, and/or environment associated with a scan of the printed material, or visa-versa (e.g. with respect to the maximum or minimum values).

The length of the color-channel can be adjusted accordingly based on the capabilities of the scanning and image-acquiring abilities of the various components, e.g. camera or video device 195, scanning device 197, and/or where the length increases the number of different colors between the minimum and maximum point of the color channel.

In various embodiments, the conversions between the RGB colorspace to the XYZ colorspace and/or a first converted-to (derivative) XYZ space to another XYZ colorspace can be governed by the tristimulus equations (Equation 1) that define the converted colorspace and a distribution of colorspace, where the value of x+y=z can be normalized to 1.

In various embodiments, the value of "X," "Y," and "Z," is dependent on the input colors from the RGB colorspace (or in the case of a second conversion, from the converting colorspace). Although the tristimulus values are three be definition, as noted above, the conversion can involve more than three color-channels, including color-channels that define colors imperceptible to the human eye. In various embodiments, the conversion governed by Equation 1 can form a key for a scanning device to scan an image defined by the conversion, such as an encoded data, e.g. multimedia data scheme (e.g. video data, audio data, image data, spatial data (which can create three-dimensional renderings), etc.) printed on a physical medium. In various embodiments, this means that in addition to providing a vehicle for increasing the numbers of color-channels and colors for an image to be scanned, which means increasing bits of information that can be encoded therein, another benefit of various embodiments is offering a manner to securely encode information, e.g. without knowing the equation or equations of what colorspace govern and without knowing the input values (which are based on the first colorspace associated with the entity, object, environment or other representational scheme 215), a successful scan cannot occur. Accordingly, in various embodiments, the logic 160 of system 100 can cause a processor 140 (or an application programmed to carried out the operations of 100) to provide a scanning device 197 with a key governed by Equation 1 in order to scan and decode an image, e.g. encoded material on a tape 195 corresponding to encoded data (e.g. video data, audio data, image data, spatial data (which can create three-dimensional renderings), etc.) that is encoded pursuant to one or more colorspace conversions associated with Equation 1.

In various embodiments, the logic 160 of system 100 can cause a processor 140 to provide a scheme for adding either one or both of an ultraviolet layer and/or an infrared layer to a scheme defining encoded data on the tape 185, e.g. multimedia data (e.g. video data, audio data, image data, spatial data (which can create three-dimensional renderings), etc.), and instruct a printing device 199 to print the same, where the printed encoded multimedia data contains more than one non-black or non-white colors governed by any suitable colorspace, and can be scanned and decoded by a suitable scanning device, e.g. scanning device 197. In various embodiments, the scheme may include both an ultraviolet layer and an infrared layer, where the ultraviolet layer may form the first layer of an image in order to take advantage of its properties. In various embodiments, the non-black and non-white colors of the printed scheme corresponding to encoded multimedia data may be determined by one or more colorspace conversion techniques as outlined herein. In various embodiments, non-black and non-white colors means colors that are not black or white. In various embodiments, non-black and non-white colors means colors that are not black, white or based on a greyscale distribution.

Figure 4:
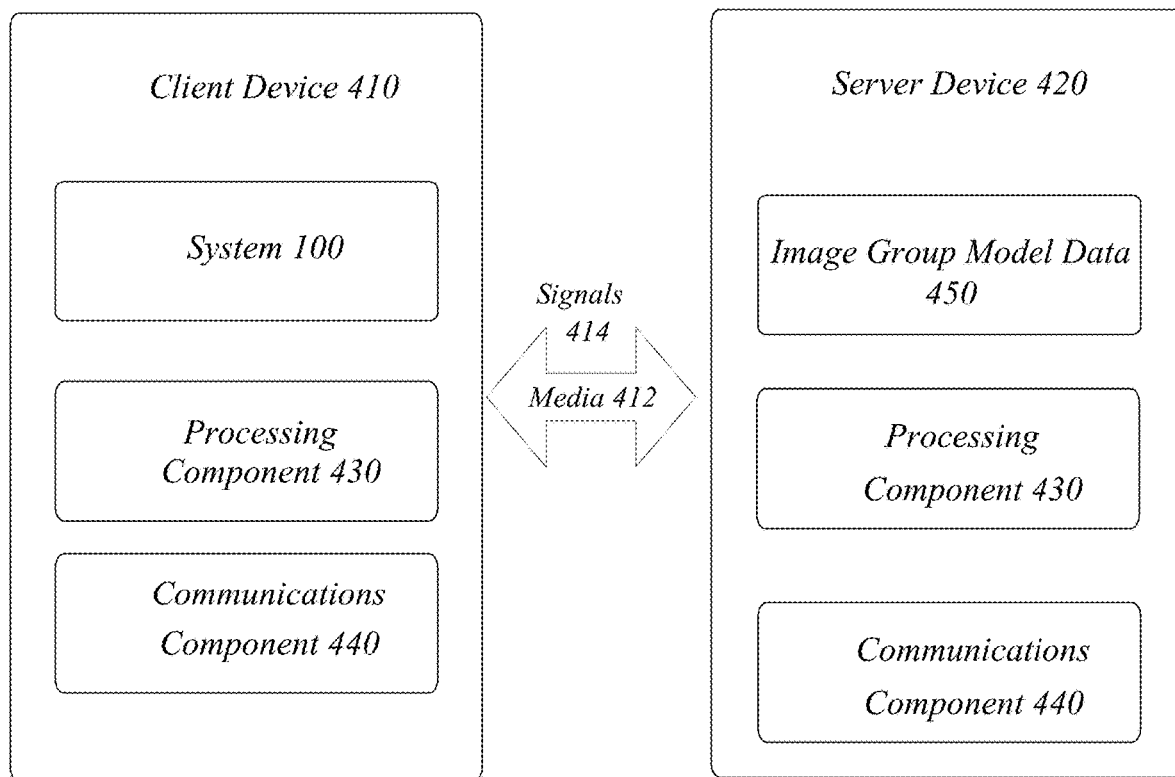
FIG. 4 illustrates an embodiment of a centralized system for the system of FIG. 1 in accordance with at least one embodiment of the present disclosure.

FIG. 4 illustrates a block diagram of a distributed system 400. The distributed system 400 may distribute portions of the structure and/or operations for the system 100 across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 400 may comprise a client device 410 and a server device 420. In general, the client device 410 and/or the server device 420 may be the same or similar to the apparatus 120 as described with reference to FIG. 1. For instance, the client device 410 and the server device 420 may each comprise a processing component 330 which is the same or similar to the processing circuit 440 as described with reference to FIG. 1. In another example, the devices 410, 420 may communicate over a communications media 412 using communications signals 414 via a communications component 440.

The server device 420 may communicate with other devices over the communications media 412, using communications signals 414, via the communications component 440. The other devices may be internal or external to the device 420 as desired for a given implementation.

The client device 410 may comprise or employ one or more client programs that operate to perform various methodologies in accordance with the described embodiments. In one embodiment, for example, the client device 410 may implement the system 100 including the logic 160 of FIG. 1, where in various embodiments, the client device 410 can implement one or more operations to form an image based on one or more colorspace conversions as outlined above and herein, and where the client device 410 may print or instruct another the device to encode the colorspace conversion as encoded data on a physical medium, such as tape.

The server device 420 may comprise or employ one or more server programs that operate to perform various methodologies in accordance with the described embodiments. In one embodiment, for example, the server device 420 may implement the clustering process 200 of FIG. 2 and generate image group model data 450 and/or generate image group model data 450 by performing one or more of the encoding and colorspace conversion operations of scheme 300. The image group model data 450 can include a printing scheme or color distribution for an image corresponding to encoded data, e.g. multimedia data (e.g. video data, audio data, image data, spatial data (which can create three-dimensional renderings), etc.), e.g. patched image data 172, to be printed, encoded and/or scanned in association with physical tape.

The devices 410, 420 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The devices 410, 420 may execute instructions, processing operations, or logic for the system 100 using the processing component 430. The processing component 430 may comprise various hardware elements, software elements, or a combination of both. Examples of hardware elements may include devices, logic devices, components, processors, microprocessors, circuits, processing circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The devices 410, 420 may execute communications operations or logic for the system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 412 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Figure 5:
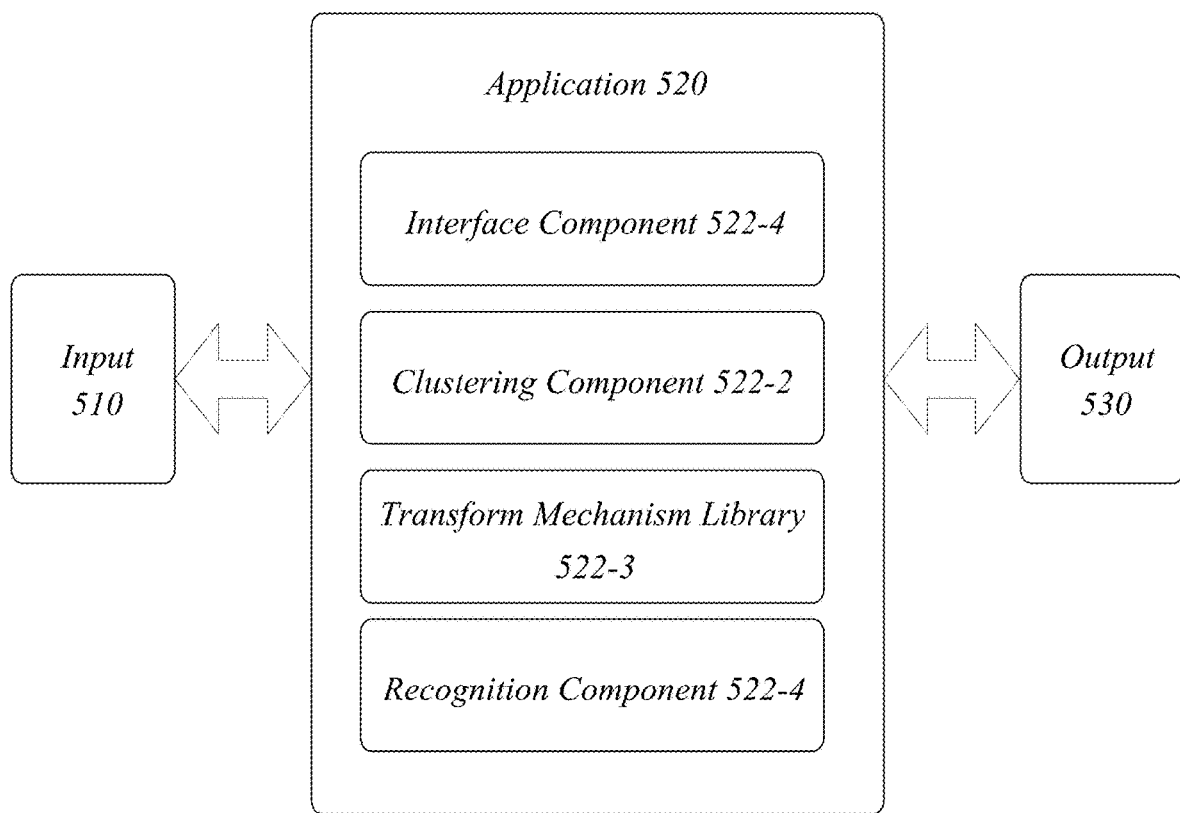
FIG. 5 illustrates an embodiment of an operating environment for the system of FIG. 1 in accordance with at least one embodiment of the present disclosure.

FIG. 5 illustrates an embodiment of an operational environment 500 for the system 500. As shown in FIG. 5, the operating environment 500 includes an application 520, such as an enterprise software application, for processing input 510 and generating output 530.

The application 520 comprises one or more components 522-a where a represents any integer number. In one embodiment, the application 520 may comprise an interface component 522-1, a clustering component 522-2, a transform mechanism library 522-3, and a recognition component 522-4. The interface component 522-1 may be generally arranged to manage a user interface for the application 520, for example, by generating graphical data for presentation as a Graphical User Interface (GUI). The interface component 522-1 may generate the GUI to depict various elements, such as dialog boxes, HTML forms having rich text, and/or the like.

The clustering component 522-2 may be generally arranged to organize images into image groups or clusters. Some embodiments of the clustering component 522-2 execute the clustering process 200 of FIG. 2 and/or one or more of the encoding, colorspace conversion operations, and/or decoding operations associated with scheme 300 of FIG. 3 and generates the image group model data 450 of FIG. 4. In various embodiments, the clustering component 522-2 identifies, for each image group, a particular colorspace transform having a higher likelihood than a current colorspace transform of success in edge detection for that group as outlined herein or otherwise suitable and uses that scheme to encode multimedia data on one or more physical medium, such as a tape, and using any device for doing such as discussed herein or otherwise suitable. In various embodiments, the clustering component 522-2 may perform the above-mentioned clustering process for a variety of edge detection techniques, resulting in sets of image groups where each set of image groups corresponds to a particular technique. Edge detection techniques vary in how boundaries are identified in an image; some techniques detect differences in color whereas other techniques measure another attribute. Some techniques differ with respect to how color differences are even measured. It is possible for one technique to alter certain steps and create multiple techniques.

The colorspace transform library 522-3 includes a plurality of colorspace transform mechanisms and may be generally arranged to provide an encoding and colorspace transform mechanism for application on an image, transforming that image into a transformed image in accordance with a different colorspace model than the image's original colorspace model, resulting in encoded data that is optimal for detection, e.g. encoded multimedia data on tape.

As described herein, the colorspace model refers to a technique for modeling an image's color data, such as in RGB or in LAB, or RGB to XYZ, or RGB to XYZ to another XYZ. In general, and as outlined in one or more embodiments herein, the colorspace transform mechanism performs mathematical operations to map a data point within the image's original/current colorspace model into a corresponding datapoint in accordance with the different colorspace model. This may involve converting the datapoint's value(s)—which are in one domain—into corresponding value(s) for the corresponding datapoint. As example, the colorspace transform may convert an RGB pixel having a tuple of RGB values into a LAB pixel having a tuple of LAB values, an RGB pixel having a tuple of RGB values into an XYZ pixel having a tuple of XYZ values, and/or an RGB pixel having a tuple of RGB values into an XYZ pixel having a tuple of XYZ values and again into another XYZ pixel having a tuple of other XYZ values. The pixels associated with the final conversion can define an encoded scheme pursuant to a color distribution, where the encoded scheme may be a scannable image, such as image data printed on tape (or any other suitable physical medium) and corresponding to encoded data, e.g. multimedia data.

The recognition component 422-4, such as a suitable scanner, printer, camera, other suitable device for printing, scanning, encoding, and/or decoding data on tape, or application for the same, may be generally arranged to execute an edge detection technique as part of a recognition operation on the transformed image. The application 420 invokes the recognition component 522-4 to perform various tasks including scanning an encoded scheme corresponding to multimedia data and decoding it. The recognition component 522-4 can be configured to contain a key, e.g. a mathematical equation or equations with specified inputs defining a colorspace conversion, such that it scans relevant colors reflected by a printed scheme of encoded data, e.g. encoded multimedia data, where the colors are based on one or more colorspace transformation techniques as outlined herein, where the key defines a final transformation that defines color-channels and a colorspace associated with colors of the scannable image, where color-channels defined by the key each represent at least one bit of encoded data, and where the key can be used to perform the decoding when a scan takes place.

In various embodiments, the recognition component 522-4 can print or provide a schema for printing and/or encoding an image or data, e.g. image data constituting an encoded representation of multimedia data, that contains one or more non-black and non-white colors and one or both of an ultraviolet layer and an infrared layer on tape. The color-channels associated with each non-black and non-white color each can constitute at least one bit of data, and each one of the infrared and ultraviolet layers can each constitute one bit of data. In various embodiments, each one of the non-black and non-white colors are generated by a colorspace transformation mechanism or technique and are scannable by a key associated with the transformation mechanism. In various embodiments, the number of color-channels can be adjusted to be greater than or equal to four color-channels, as the recognition component 522-4 can be adjusted to scan any number of colors, including colors not perceptible to the human eye.

In various embodiments, the non-black and non-white color-channel can be used in conjunction with one or both of the infrared or ultraviolet layers on a scannable image, where each of one of the color-channels, ultraviolet layer(s), and/or infrared layer(s) represent a bit of data and a different manner of encoding data into the image, and as such, eight or more bits of data can be encoded into the image. In various embodiments, the ultraviolet layer may be printed or displayed first in relation to the infrared layers and the various layers associated with non-black and non-white color-channels to take advantage of the ultraviolet layer's properties.

In various embodiments, the image containing all or one of the layers associated with the non-black and non-white color-channel layers, the ultraviolet layers, and the infrared layers can be scanned by the recognition component 522-4 for a verification component, where the recognition component 522-4 may contain or receive a key that is based on an equation related to a colorspace conversion, e.g. Equation 1, where the colorspace conversion reveals the relevant color-channels with associated colors containing the information, in addition to one or more verification bits indicating whether the presence or absence of an ultraviolet and/or infrared layer is indicative of encoded information. Accordingly, the key and/or verification bit provides a manner of decoding information.

In various embodiments, application 520 is configured to contain the key and/or verification bit and provide an output 530 once the scan of the image is verified locally. In various embodiments, the recognition component 522-4 can require an additional verification step of contacting a host system that contains one or more of the functionalities of system 100, to confirm, e.g., by one or more comparison steps, that the key and/or verification bit used by the recognition component 522-4 is accurate. If the key is accurate, and the scan is confirmed by the recognition component 522-4, then the output 530 of application 520 is one or more access, transfer, or receipt of information, including currency, personal, and/or financial information, to another entity.

Figure 6:
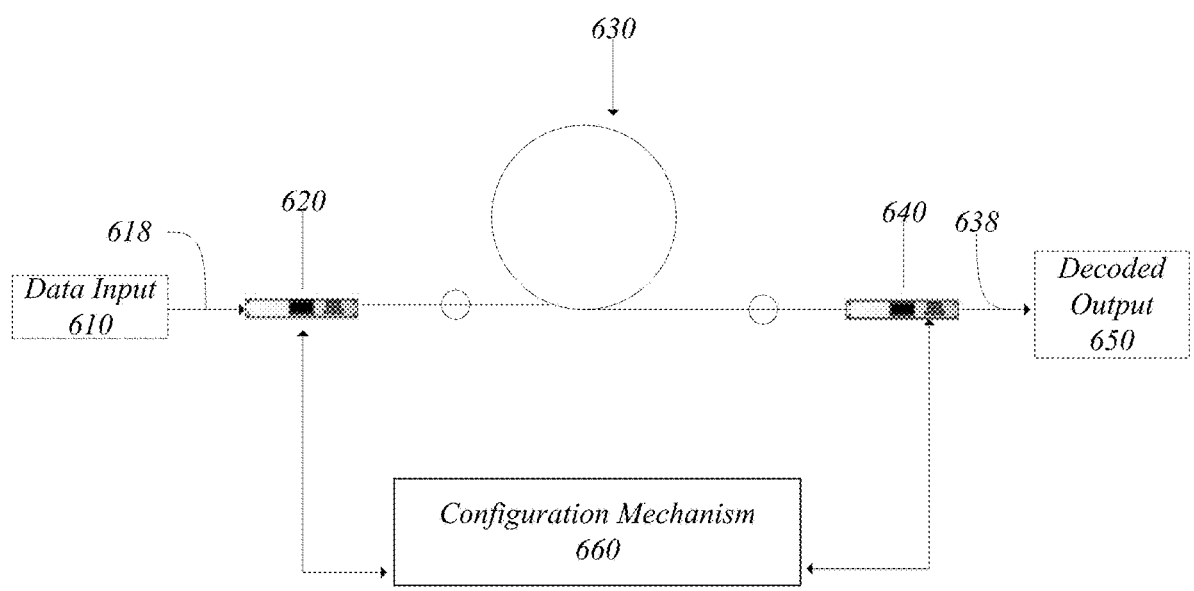
FIG. 6 illustrates an embodiment of a physical medium system that can be used to encode, transmit, and/or decode data in accordance with at least one embodiment of the present disclosure.

FIG. 6 illustrates an embodiment of a tape encoding and transmission system 600 that can be used to encode data, transmit encoded data and/or decode encoded data on a physical medium such as tape. In various embodiments, the system 300 includes at least two nodes 618 and 638 along a tape 630, where one node 618 is associated with any device 620 that can encode or decode data on tape as described herein or otherwise suitable, and where one node 638 is associated with a device 620 that can encode or decode data on tape as described herein or otherwise suitable. The device 620 and the device 640 may be controlled or configured by a configuration mechanism 660 that includes one or more components for implementing at least one functionality of system 100. In various embodiments, the configuration mechanism 360 may be a satellite, server, t or any other suitable mechanism that may remotely control a computer device over a wireless network, e.g. internet or intranet, and/or a suitable mechanism that controls the device 620 and the device 640 via a direct wired connection made by any suitable wired connection, e.g. fiberoptic (a separate fiberoptic connection or as part of cable), electrical, etc. The configuration mechanism 660 can permit alternating portions of the tape 630 to be encoded with different data and pursuant to different schemes, and in various embodiments, the devices 620 and 640 perform any encoding and/or decoding operation by direct physical connection to the tape, allowing for immediate changes along the tape 630 and along particular spacing along the tape 630.

In various embodiments, the device 620 receives a data input 610 at node 618, where the data input may include financial data or information, multimedia data or information, security data or information, or any other data or information that may be suitable for transmission. The data input 610 may be in the form of electrical signals, magnetic signals, or any other suitable signal for encoding on tape, and the device 620 may detect the signals and communicate with the configuration mechanism 660. The configuration mechanism 660 may perform a series of conversion and encryption operations on the data input 110. In various embodiments, the configuration mechanism 660 may perform one or more operations to generate a first colorspace model representing the data input 610, where the first colorspace model may include one or more colors that can be generated and transmitted by the device 620 and encoded onto one or more segments of the tape 630.

In various embodiments, once the configuration mechanism 660 determines a first colorspace for the data input 610, then it may perform one or more colorspace conversions to encode the data input 610 into encoded data, such that the encoding on one or more segments of the tape 630 is not merely the first colorspace representation of the data input 610 or a portion of the data input 610, but a conversion from a first colorspace representation to a second colorspace representation. The colorspace conversions to establish the encoding may be any suitable colorspace conversions and models as discussed herein. In various embodiments, before or after the configuration mechanism provides a colorspace encoding scheme, it can apply an additional encryption, e.g. a non-color encryption technique such as PGP encryption, to the incoming data input 610, so as to add an additional layer of compression and security to the encoded representation of data input 610. In various embodiments, the key for decrypting the encoded representation of data input 610 may be the mathematical definition defining the second colorspace (or the final colorspace and relevant intermediary colorspaces if multiple conversions are performed), in addition to an appropriate decrypting scheme, key, or information associated with the non-color-based encryption, e.g. PGP encryption, all of which may be transmitted to the device 640 so that it may decode a transmission associated with this type of encoding scheme. Various portions, e.g. alternating portions, of the tape 630 can be encoded pursuant to a colorspace and/or one or more distinct colorspace conversions such that each portion of the tape has a distinct key for decryption in association therewith.

In various embodiments, once the configuration mechanism 660 determines the colorspace model and conversions that will govern the encoding on the tape, it may instruct the device 620 to encode the data 610 pursuant to the color scheme or schemes, e.g. conversions, along the tape such that alternating material on the tape represents an encoded version of portions of data input 610. In various embodiments, the configuration mechanism 660 may utilize a colorspace transformation that is optimized for detection and transmission based on the sensor and other technical capabilities of the device 620 and device 640, e.g. the configuration mechanism 660 will not select colors or associated colorspaces that are associated with colors that cannot be sensed by the device 640 and/or generated by the device 620. In various embodiments, a parity check or Hamming Code may be based on a luminance value, e.g. a brightness value associated with the plurality of signals, the range values of which may also be provided to the device 640. In various embodiments, the colorspace encoding may include at least one of i) an infrared channel and ii) an ultraviolet channel, where in various embodiments, either one or both the infrared and/or ultraviolet channel may represent superimposed ultraviolet and/or infrared variations, respectively, from a first-colorspace.

In various embodiments, the configuration mechanism 660 may provide, as stated above, the device 640 with the decryption and encoding information required to decrypt the encoded portions of data input 610 along alternating portions of tape 630, including the mathematical definition governing any colorspace conversions along the alternating portions, and by extension, the information required to identify which color-channels contain encoded information, including ultraviolet and infrared channels. In various embodiments, the device 640 may activate relevant sensors required to read the relevant color-channels and the configuration mechanism 660 may instruct the device 640 to sequence the bits of the color-channel pursuant to a cipher (discussed in greater detail with respect to FIG. 7) or other suitable mechanism, resulting in decoded output 650. In various embodiments, the decoded output 650 may be provided to any suitable computing device, including being fed back to configuration mechanism 660 for verification and/or for transmission to another node and/or device.

One or more devices at input node 618, node 620, node 640 and output node 638 may, in addition to a relevant device for encoding, decoding, and/or otherwise printing material on tape, include any electronic device capable of receiving, processing, and sending information for the system 100 and/or for configuration mechanism 660. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. In various embodiments, the above components and/or functions are part of one or more of the configuration mechanism 660 and/or any devices at nodes 320 and 340. The embodiments are not limited in this context.

In various embodiments, one or more devices at input node 618, output node 638, node 620, and node 640 may execute instructions, processing operations, or logic for the system 100 using one or more processing components, and in lieu of or in conjunction with configuration mechanism 660 and/or any other suitable devices associated with system 600. The processing components at the nodes may comprise various hardware elements, software elements, or a combination of both. Examples of hardware elements may include devices, logic devices, components, processors, microprocessors, circuits, processing circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. In various embodiments, the above components and/or functions are part of one or more of the configuration mechanism 660 and/or any devices at nodes 320 and 340. The embodiments are not limited in this context.

In various embodiments, one or more devices at input node 618 and output node 638, including but not limited to the devices 620, 640 and configuration mechanism 660, may execute communications operations or logic for the system 100. The communications components may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Figure 7:
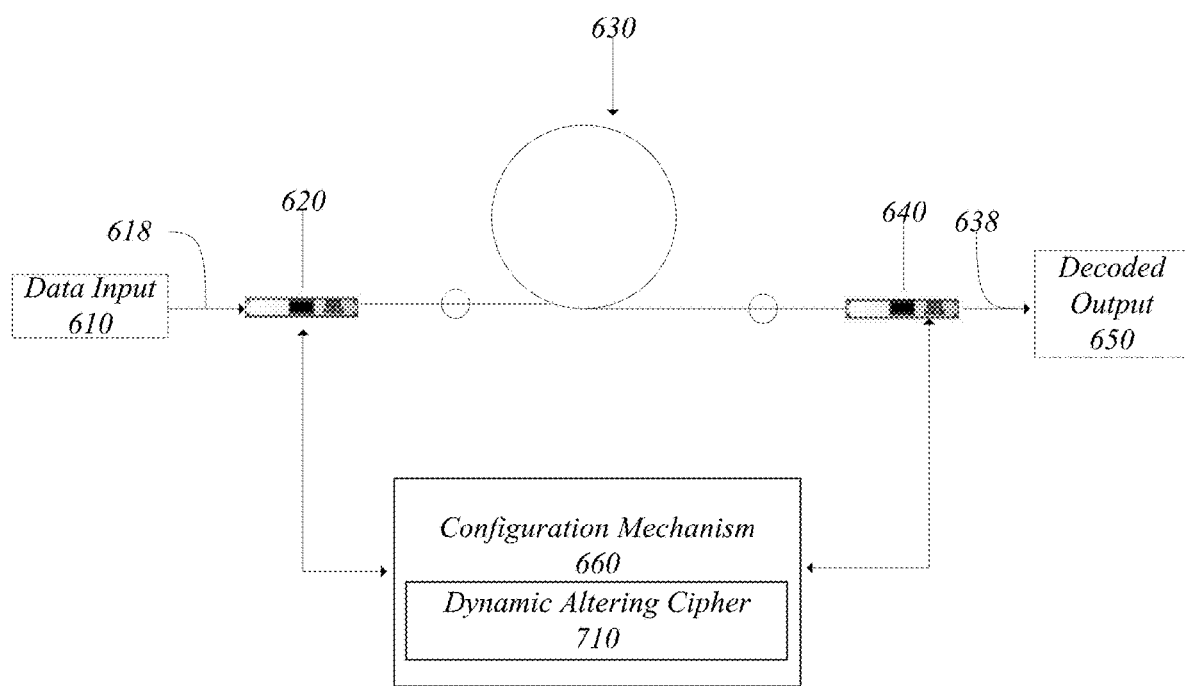
FIG. 7 illustrates an embodiment of a physical medium system that can be used to encode, transmit, and/or decode data in accordance with at least one embodiment of the present disclosure.

FIG. 7 illustrates tape encoding and transmission system 700 such as that of FIG. 6 with a dynamic alternating dynamic cipher 710 part of the configuration mechanism 660. The dynamic alternating cypher 710 may be configured to automatically change the colorspace and encoding scheme applied to incoming data input sets 610 based on a time interval, a threshold of an amount of data processed, or any other threshold that may be assessed automatically. The configuration mechanism 660 may then update modifications required to the encoding at the input 610 and relay the update information associated with the cipher 710, including colorspace modifications, to the device 640, such that the device 640 may decrypt a subsequent transmission or encoding along the tape 630 based on the modification and/or update producing decrypted output 650. The cipher 710 may provide components at nodes 620 and 640, with respect to one or more encodings (e.g. encoded portions) along the tape, with information related to: i) the key defining the one or more colorspace conversions ii) the order or sequencing of information, e.g. color values or range values, of data associated with the color-channels containing an encoded representation of datasets 610, e.g. the bit order or sequencing of the color values of a particular color-channel iii) the order or sequencing of the color-channels containing the encoded representation of datasets 710 with respect to one another, e.g. the bit sequence that bits are to be ordered between and amongst color-channels, iv) the timing at which a sensing or detection should occur based on a timing or processing threshold and/or v) any decryption technique that may be applied to a non-colorspace encryption technique applied to datasets 172, such as PGP encryption.

In various embodiments, the dynamic cipher 710 automatically changes one or more aspects of the encryption associated with one portion of the tape in relation to another-to-be encoded portion of the tape, and the configuration mechanism 660 may update any device that can decrypt or decode any portion of the tape 630 for modification that changes the relevant information necessary for decryption or decoding (e.g. changing the nature of encoding or encryption) including i) changing which color-channels of a colorspace contain the encoded data, ii) changing the nature, if any, of any superimposition of color-channels from a first colorspace as reflected and/or represented in a second colorspace, iii) changing the range values of one or more color-channels contained or associated with encoded data representing any portion of data input sets 610 by performing a mathematical operation on value ranges of the one or more color-channels, such as an addition, multiplication, division or other suitable operation that would affect the range values defining bit values in that color-channel or color-channels, iv) the timing at which a sensing or detection should occur (based on a timing or processing threshold) and/or v) using a completely different colorspace conversion to represent a first transmitted portion of an encrypted datasets 610, e.g. a portion of datasets 610 are associated and transmitted and/or encoded along the tape 630 by the transmitter 620 with a colorspace conversion that culminates in one colorspace and, with respect to another portion of datasets 610 as represented by another portion of encoded dataset transmissions along line 630, a subsequent transmission is governed by another colorspace conversion culminating in another and different colorspace.

Accordingly, various embodiments provided for by FIG. 6 and FIG. 7 provide for one or more systems for transmitting, encoding, and decoding data pursuant to one or more colorspace schemes along tape, where various embodiments add a layer of non-colorspace encoding techniques in the encoding of the data, and where various embodiments provide for an alteration of the encoding (and by extension decoding) based on an alternating cipher that adjusts the encoding at the input of the system and the decoding at the output of the system.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art may understand and appreciate that a methodology could alternatively be represented as a series of interrelated states or events, such as in a state diagram. Moreover, not all acts illustrated in a methodology may be required for a novel implementation.

Figure 8:
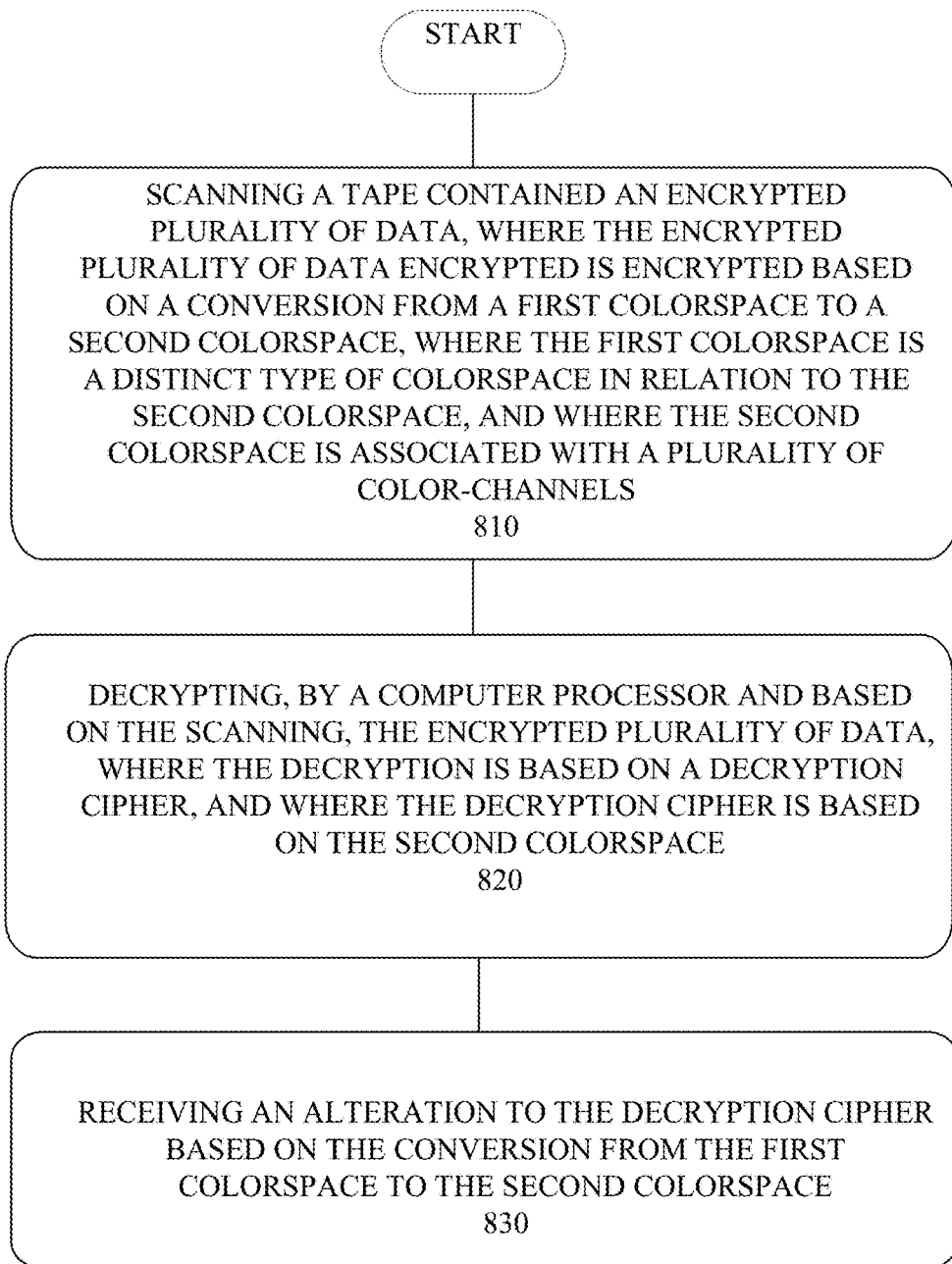
FIG. 8 illustrates an embodiment of a logic flow for the system of FIG. 1 and in accordance with at least one embodiment of the present disclosure.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 scans a tape containing an encrypted plurality of data, where the encrypted plurality of data encrypted is encrypted based on a conversion from a first colorspace to a second colorspace, where the first colorspace is a distinct type of colorspace in relation to the second colorspace, and where the second colorspace is associated with a plurality of color-channel 810. In various embodiments, w the first colorspace may be a representation of data any suitable data including but not limited to financial data or information, multimedia data or information, security data or information, messages concerning any of the previously mentioned items, or any other data or information that may be suitable for encoding along physical tape.

The logic flow 800 may decrypt, by a suitable computer processor and based on the scanning, the encrypted plurality of data, where the decryption is based on a decryption cipher and/or keys, and where the decryption cipher is based on the second colorspace, e.g. the conversion from the first colorspace to the second colorspace 820. In various embodiments, the cipher provides one or more keys that are associated with different portions of the tape, where the keys are associated with at least two distinct colorspace conversions representing at least two distinct portions of data along the tape. Further, in various embodiments, the logic flow may receive an alteration to the decryption cipher based on the conversion from the first colorspace to the second colorspace or any other colorspace conversion associated with a portion of the tape and using any suitable technique as discussed herein 830.

Figure 9:
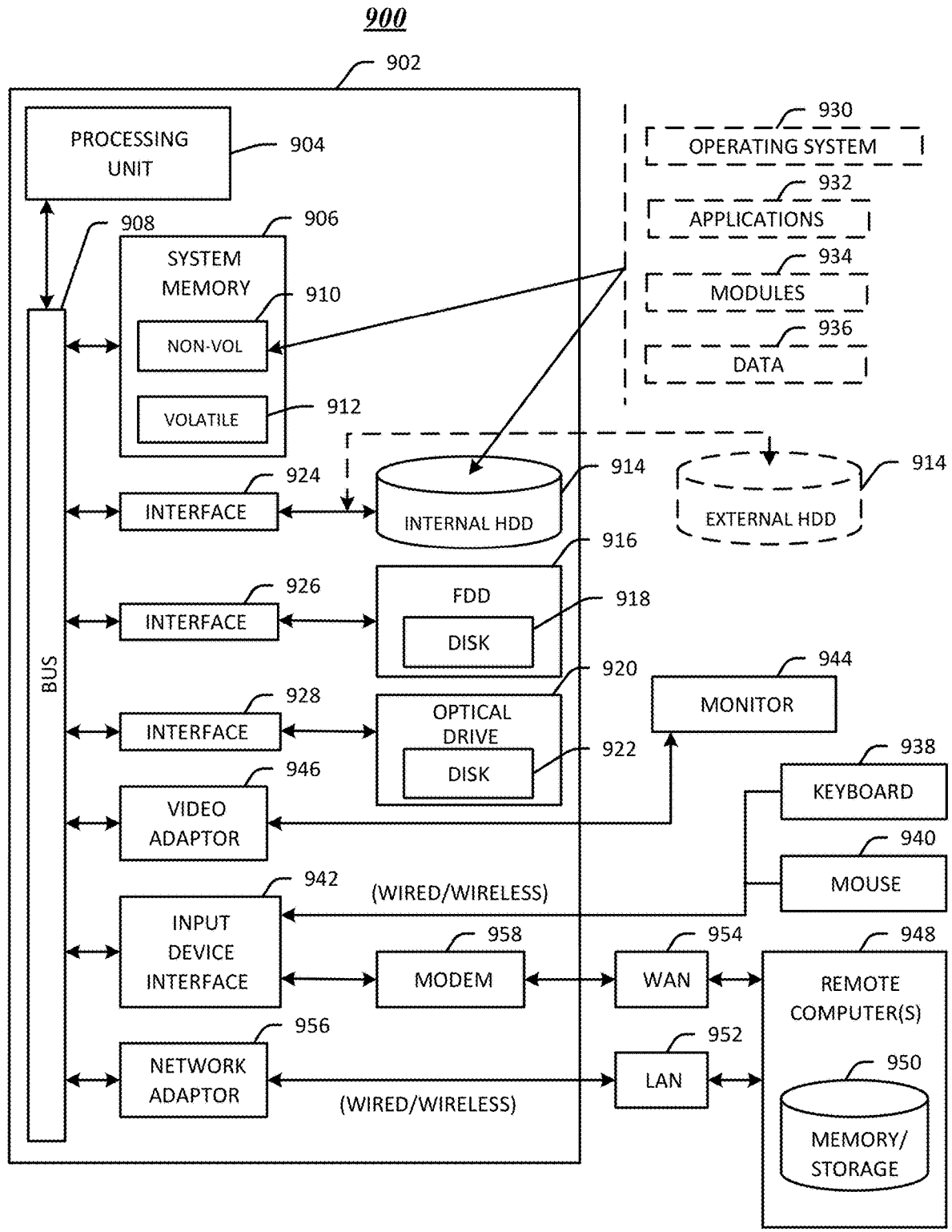
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 3, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by an HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908 but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954 or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It may be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
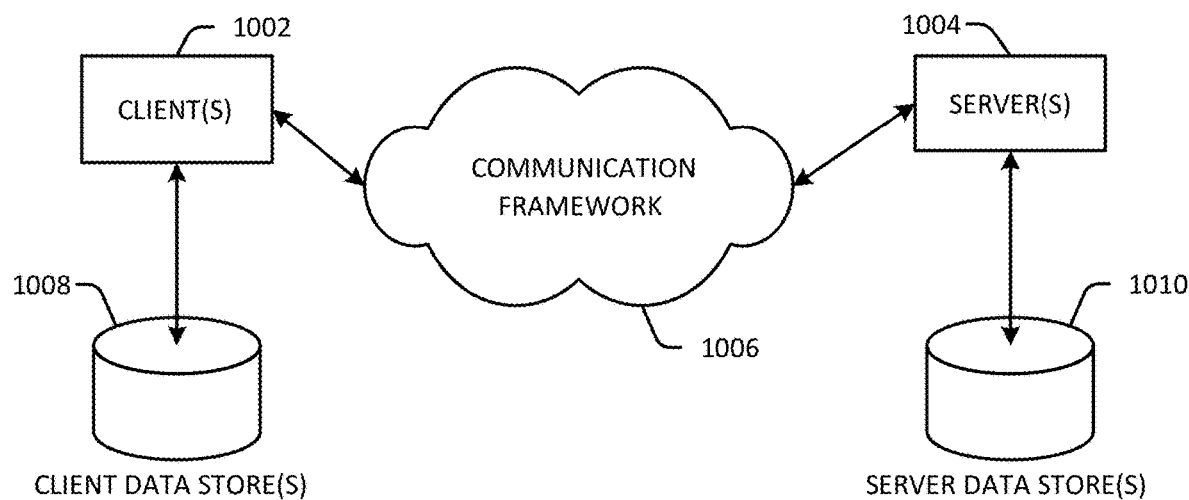
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 1002. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a memory to store instructions; and
processing circuitry, coupled with the memory, operable to execute the instructions to cause the processing circuitry to:
determine a first color channel associated with a most prevalent color of a colorspace, the colorspace generated based on a conversion from a different colorspace;
determine a second color channel associated with a least prevalent color of the colorspace based on a distribution of the colorspace; and
encrypt a plurality of data on a tape based on the colorspace and a plurality of color channels between the first color channel the second color channel, wherein the conversion from the different colorspace to the colorspace defines a key for decrypting the encrypted plurality of data.

2. The apparatus of claim 1, wherein the most prevalent color of the colorspace is a maximum value of the first color channel, wherein the least prevalent color of the colorspace is a minimum value of the second color channel.

3. The apparatus of claim 2, wherein the second color channel is determined based on a distance between the most prevalent color and the least prevalent color in the distribution.

4. The apparatus of claim 1, wherein the colorspace has at least one luminance channel, and wherein the processing circuitry is further configured to remove the luminance channel to generate the distribution of the colorspace.

5. The apparatus of claim 1, wherein the processing circuitry is further configured to perform the encryption based at least in part on an infrared channel.

6. The apparatus of claim 1, wherein the processing circuitry is further configured to perform the encryption based at least in part on an ultraviolet channel.

7. The apparatus of claim 1, wherein the distribution is based on a histogram.

8. A non-transitory computer-readable storage medium comprising instructions that when executed by a computing device, cause the computing device to:
determine a first color channel associated with a most prevalent color of a colorspace, the colorspace generated based on a conversion from a different colorspace;
determine a second color channel associated with a least prevalent color of the colorspace based on a distribution of the colorspace; and
encrypt a plurality of data on a tape based on the colorspace and a plurality of color channels between the first color channel the second color channel, wherein the conversion from the different colorspace to the colorspace defines a key for decrypting the encrypted plurality of data.

9. The computer-readable storage medium of claim 8, wherein the most prevalent color of the colorspace is a maximum value of the first color channel, wherein the least prevalent color of the colorspace is a minimum value of the second color channel.

10. The computer-readable storage medium of claim 9, wherein the second color channel is determined based on a distance between the most prevalent color and the least prevalent color in the distribution.

11. The computer-readable storage medium of claim 8, wherein the colorspace has at least one luminance channel, wherein the medium further comprises instructions that when executed by the computing device cause the computing device to:
remove the luminance channel to generate the distribution of the colorspace.

12. The computer-readable storage medium of claim 8, further comprising instructions that when executed by the computing device cause the computing device to:
perform the encryption based at least in part on an infrared channel.

13. The computer-readable storage medium of claim 8, further comprising instructions that when executed by the computing device cause the computing device to:
perform the encryption based at least in part on an ultraviolet channel.

14. The computer-readable storage medium of claim 8, wherein the distribution is based on a histogram.

15. A method, comprising:
determining, by a computer processor, a first color channel associated with a most prevalent color of a colorspace, the colorspace generated based on a conversion from a different colorspace;
determining, by the processor, a second color channel associated with a least prevalent color of the colorspace based on a distribution of the colorspace; and
encrypting, by the processor, a plurality of data on a tape based on the colorspace and a plurality of color channels between the first color channel the second color channel, wherein the conversion from the different colorspace to the colorspace defines a key for decrypting the encrypted plurality of data.

16. The method of claim 15, wherein the most prevalent color of the colorspace is a maximum value of the first color channel, wherein the least prevalent color of the colorspace is a minimum value of the second color channel.

17. The method of claim 16, wherein the second color channel is determined based on a distance between the most prevalent color and the least prevalent color in the distribution.

18. The method of claim 15, wherein the colorspace has at least one luminance channel, the method further comprising:

removing the luminance channel to generate the distribution of the colorspace.

19. The method of claim 15, wherein the encryption is based at least in part on an infrared channel.

20. The method of claim 15, wherein the encryption is based at least in part on an ultraviolet channel.

* * * * *